United States Patent
Fang et al.

(10) Patent No.: US 10,591,722 B2
(45) Date of Patent: Mar. 17, 2020

(54) DISPLAY SYSTEM AND TRANSFLECTIVE OPTICAL PLATE

(71) Applicant: Coretronic Corporation, Hsin-Chu (TW)

(72) Inventors: Chong-Yang Fang, Hsin-Chu (TW); Chi-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 209 days.

(21) Appl. No.: 15/398,694

(22) Filed: Jan. 4, 2017

(65) Prior Publication Data

US 2017/0219818 A1      Aug. 3, 2017

(30) Foreign Application Priority Data

Feb. 2, 2016   (TW) .............................. 105103338 A

(51) Int. Cl.
| | |
|---|---|
| *G02B 5/30* | (2006.01) |
| *G02B 27/00* | (2006.01) |
| *G02B 27/01* | (2006.01) |
| *G02B 27/28* | (2006.01) |
| *G02B 5/20* | (2006.01) |

(52) U.S. Cl.
CPC ......... *G02B 27/0018* (2013.01); *G02B 5/208* (2013.01); *G02B 5/3083* (2013.01); *G02B 27/0101* (2013.01); *G02B 27/283* (2013.01); *G02B 2027/0118* (2013.01)

(58) Field of Classification Search
CPC .. G02B 5/208; G02B 5/3083; G02B 27/0101; G02B 27/283; G20B 27/0018

USPC ............... 359/352, 360, 488.01, 489.07, 630
See application file for complete search history.

(56) References Cited

U.S. PATENT DOCUMENTS

| | | | | |
|---|---|---|---|---|
| 2,102,632 | A * | 12/1937 | Land | G02B 27/281 296/97.2 |
| 2,433,503 | A * | 12/1947 | Young | G02B 27/281 156/99 |
| 2,750,833 | A * | 6/1956 | Gross | B32B 17/10036 356/251 |
| 3,377,118 | A * | 4/1968 | MacNeille | B64C 1/1484 244/121 |

(Continued)

FOREIGN PATENT DOCUMENTS

| | | |
|---|---|---|
| CN | 101446653 | 6/2009 |
| CN | 101506701 | 8/2009 |

(Continued)

OTHER PUBLICATIONS

"Office Action of Taiwan Counterpart Application," dated Mar. 8, 2017, p. 1-p. 6, in which the listed references were cited.

(Continued)

*Primary Examiner* — Ricky D Shafer
(74) *Attorney, Agent, or Firm* — JCIPRNET

(57) ABSTRACT

A transflective optical plate including a polarization conversion unit, an optical film, and a transparent protective layer is provided. The polarization conversion unit is adapted to change a polarization state of a polarized image light and includes a combiner. The optical film is disposed on the combiner. The transparent protective layer is disposed on the optical film, and the optical film is located between the combiner and the transparent protective layer. A display system is also provided.

13 Claims, 6 Drawing Sheets

(56) References Cited

U.S. PATENT DOCUMENTS

| | | | |
|---|---|---|---|
| 4,973,132 A * | 11/1990 | McDonald | G02B 5/3066 359/13 |
| 5,510,913 A | 4/1996 | Hashimoto et al. | |
| 6,259,559 B1 * | 7/2001 | Kobayashi | B32B 17/10036 359/485.02 |
| 7,123,418 B2 | 10/2006 | Weber et al. | |
| 7,158,095 B2 * | 1/2007 | Jenson | G02B 27/0101 345/207 |
| 7,355,796 B2 | 4/2008 | Robinson | |
| 7,839,574 B2 | 11/2010 | Okada et al. | |
| 2009/0153962 A1 * | 6/2009 | Okada | G02B 27/0101 359/485.02 |
| 2010/0177383 A1 * | 7/2010 | Kamada | B32B 17/10036 359/485.02 |
| 2017/0242247 A1 * | 8/2017 | Tso | G02B 5/00 |

FOREIGN PATENT DOCUMENTS

| | | |
|---|---|---|
| CN | 204166197 | 2/2015 |
| TW | 200935090 | 8/2009 |
| TW | M476720 | 4/2014 |
| TW | 201439140 | 10/2014 |

OTHER PUBLICATIONS

"Office Action of China Counterpart Application," dated Dec. 13, 2018, p. 1-p. 12.

* cited by examiner

DISPLAY SYSTEM AND TRANSFLECTIVE OPTICAL PLATE

CROSS-REFERENCE TO RELATED APPLICATION

This application claims the priority benefit of Taiwan application serial no. 105103338, filed on Feb. 2, 2016. The entirety of the above-mentioned patent application is hereby incorporated by reference herein and made a part of this specification.

BACKGROUND OF THE INVENTION

Field of the Invention

The invention relates to a display system and a transflective optical plate and more particularly relates to a display system and a transflective optical plate that improve ghost images.

Description of Related Art

As the demand for electronic parts of vehicles continues to grow in these years, a variety of display systems for vehicles have been developed. HUD (head up display) has been widely used as a flight auxiliary instrument for aircraft. Now some cars are also equipped with such HUD to project driving information, such as speed, RPM, engine water temperature, whether the door is properly closed, mileage, or fuel consumption, to the windshield for the driver to watch. Because the HUD reduces the frequency of taking eyes off the road, it is conducive to driving safety.

The image light generated from the HUD is projected to the windshield and then reflected into the driver's eyes, such that the driver can see a combined image of the outside view and the driving information outside the windscreen. Since the windscreen has a certain thickness and the inner surface and outer surface of the windscreen both reflect the image light, if the image lights do not properly overlap, the driver would see multiple images, which are also called "ghost images." In view of the above, how to improve the ghost images is an issue that needs to be addressed in this field.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a display system that renders favorable image quality.

The invention provides a transflective optical plate that improves ghost images.

Other objects and advantages of the invention can be further illustrated by the technical features broadly embodied and described as follows.

In order to achieve one or a portion of or all of the objects or other objects, an embodiment of the invention provides a display system that includes an image source and a transflective optical plate. The image source provides a polarized image light. The transflective optical plate is disposed on a transmission path of the polarized image light and includes a polarization conversion unit, an optical film, and a transparent protective layer. The polarization conversion unit is adapted to change a polarization state of the polarized image light and includes a combiner. The optical film is disposed on the combiner. The transparent protective layer is disposed on the optical film, and the optical film is located between the combiner and the transparent protective layer.

In order to achieve one or a portion of or all of the objects or other objects, an embodiment of the invention provides a transflective optical plate that includes a polarization conversion unit, an optical film, and a transparent protective layer. The polarization conversion unit is adapted to change a polarization state of a polarized image light and includes a combiner. The optical film is disposed on the combiner. The transparent protective layer is disposed on the optical film, and the optical film is located between the combiner and the transparent protective layer.

Based on the above, the embodiments of the invention have at least one of the following advantages or effects. According to the embodiments of the invention, the polarization conversion unit changes the polarization state of the polarized image light, so as to use the difference between the reflectivities of different polarized lights with respect to interface reflection to enhance the light intensity difference between the polarized image light reflected by the inner surface of the transflective optical plate (referred to as "inner polarized image light" hereinafter) and the polarized image light reflected by the outer surface of the transflective optical plate (referred to as "outer polarized image light" hereinafter). Moreover, in the embodiments of the invention, the optical film further enhances the light intensity difference between the inner polarized image light and the outer polarized image light or reduces interference of the ambient light. Accordingly, the transflective optical plate of the invention improves the problem of ghost images, and the display system of the invention renders favorable image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
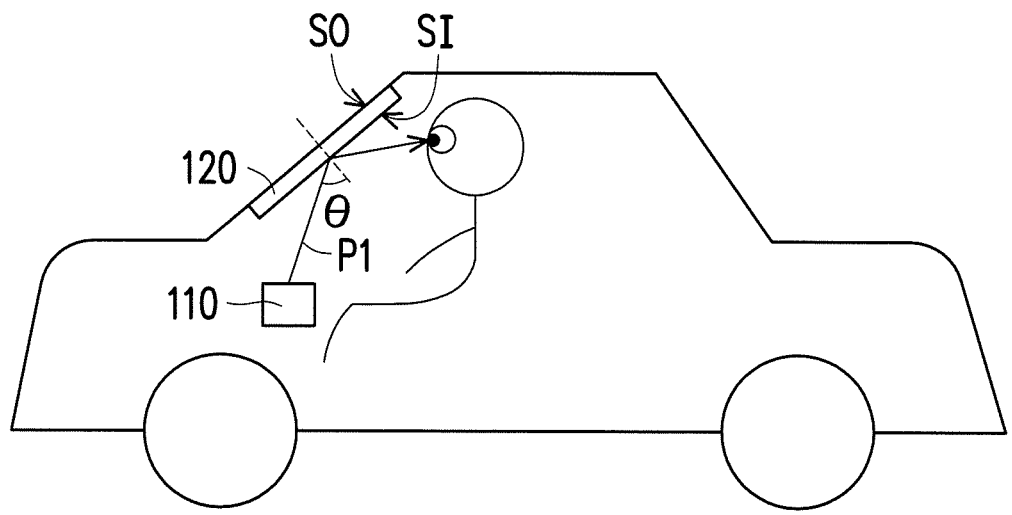
FIG. 1 is a schematic diagram of a display system according to an embodiment of the invention.
Figure 2:
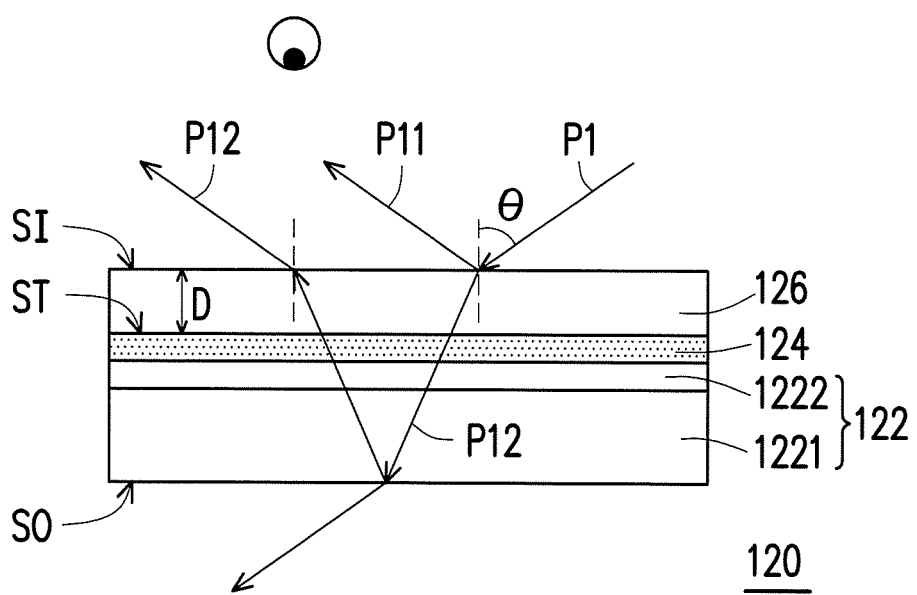
FIG. 2 is a first schematic diagram of a transflective optical plate of FIG. 1.

FIG. 1 is a schematic diagram of a display system according to an embodiment of the invention. FIG. 2 is a first schematic diagram of a transflective optical plate of FIG. 1. A display system 100 of FIG. 1 is a vehicle display system, for example. Nevertheless, application of the display system 100 is not limited thereto. For example, the display system 100 may be a display system for other transportation, e.g. aircraft or ship.

Referring to FIG. 1 and FIG. 2, the display system 100 includes an image source 110 and a transflective optical plate 120. The image source 110 provides a polarized image light P1. The image source 110 may be a display module or a projection module. Take the projection module as an example, the image source 110 may include a light source module (not shown) and an imaging device (not shown). The light source module may include a light emitting diode or other types of light sources. The imaging device may include a MEMS (Micro Electro-Mechanical Systems) scan lens, a LCD (liquid crystal device), a LCOS (liquid crystal on silicon) device, or a DMD (digital micro-mirror device). According to different requirements, the image source 110 may further include at least one optical device, e.g. a lens or a reflective device, etc.

The transflective optical plate 120 is disposed on a transmission path of the polarized image light P1 and has an inner surface SI and an outer surface SO opposite to the inner surface SI. The inner surface SI is a surface of the transflective optical plate 120 that faces a driver while the outer surface SO is a surface of the transflective optical plate 120 that faces away from the driver.

The transflective optical plate 120 includes a polarization conversion unit 122, an optical film 124, and a transparent protective layer 126. The polarization conversion unit 122 is adapted to change a polarization state of the polarized image light P1. The polarization conversion unit 122 includes a combiner 1221. The optical film 124 is disposed on the combiner 1221. The transparent protective layer 126 is disposed on the optical film 124, and the optical film 124 is located between the combiner 1221 and the transparent protective layer 126.

In this embodiment, the combiner 1221 is used as a windshield, which is formed of an isotropic material or a low complex refractive index material, for example. The low complex refractive index material means that a product of a refractive index difference and a thickness of the material is 1000 nm or less, and preferably 100 nm or less. For example, a material of the combiner 1221 may include glass, propylene carbonate (PC), cyclic olefin copolymer (COC), cyclo-olefin polymer (COP), polymethylmethacrylate (PMMA), tri-acetyl-cellulose (TAC), silicon oxide, or titanium oxide, but not limited thereto. In another embodiment, the combiner 1221 and the windshield may be independent components, and the combiner 1221 may be disposed in the vehicle close to the windshield, so as to reduce the frequency that the driver takes his eyes off the road ahead. In addition, the combiner 1221 may be a transparent plate with no curvature (as shown in FIG. 2) or a transparent plate that has a curvature.

Figure 6:
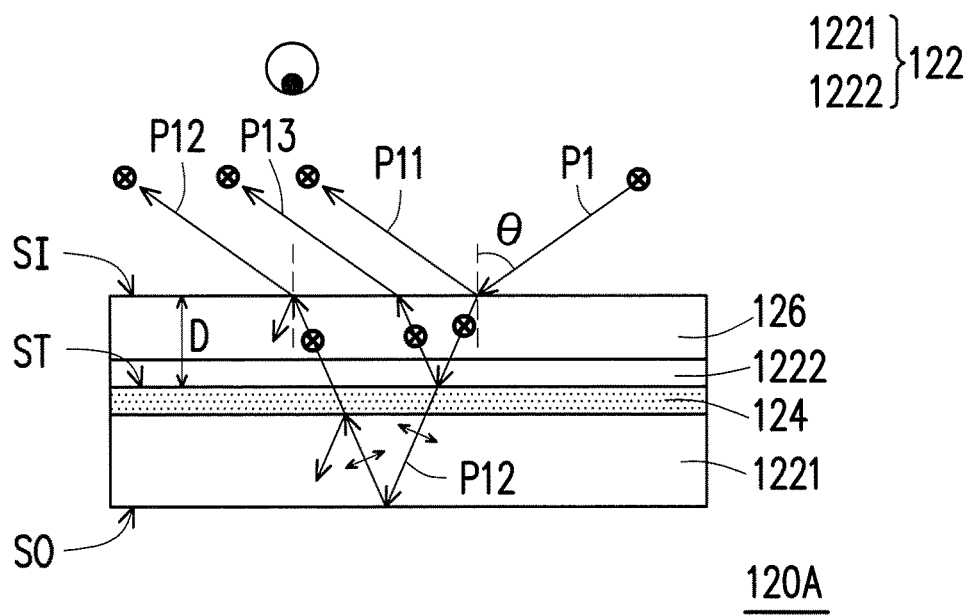
FIG. 6 is a second schematic diagram of the transflective optical plate of FIG. 1, wherein an optical film of the transflective optical plate is a visible light micro-reflective film.
Figure 8:
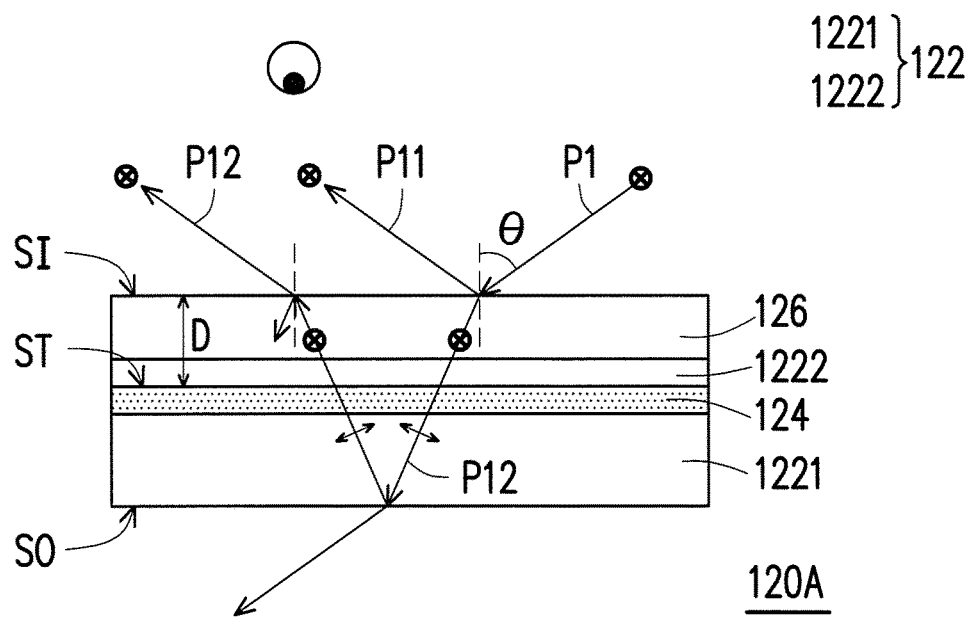
FIG. 8 is a second schematic diagram of the transflective optical plate of FIG. 1, wherein the optical film of the transflective optical plate is a visible light micro-absorption film.

The polarization conversion unit 122 may further include a half-wave plate 1222 for changing the polarization state of the polarized image light P1. The half-wave plate 1222 is disposed on the combiner 1221 and located between the combiner 1221 and the transparent protective layer 126. FIG. 2 illustrates a case where the half-wave plate 1222 is located between the combiner 1221 and the optical film 124, but the invention is not limited thereto. In another embodiment, the half-wave plate 1222 may be located between the optical film 124 and the transparent protective layer 126 (as shown in FIG. 6 and FIG. 8).

Figure 3:
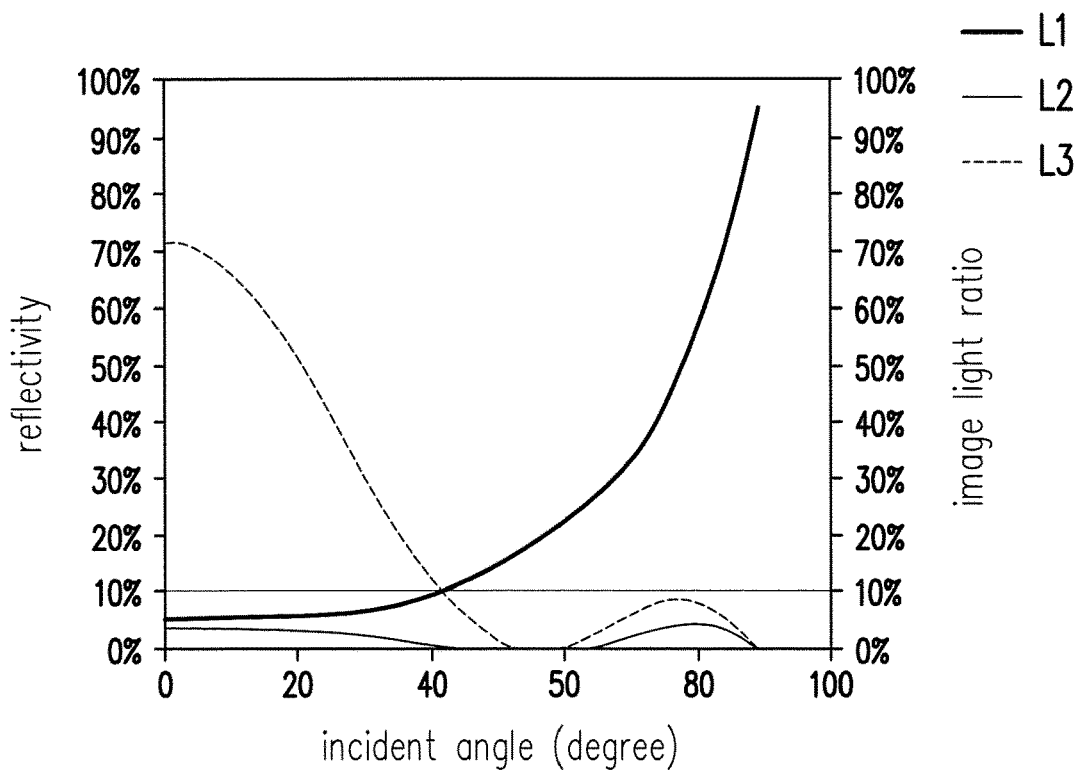
FIG. 3 is a graph showing a relationship between the incident angle and reflectivity/the image light intensity ratio between the outer polarized image light and the inner polarized image light in a case where the display system includes a polarization conversion unit and the polarized image light projected by the image source is an S-polarized light.
Figure 4:
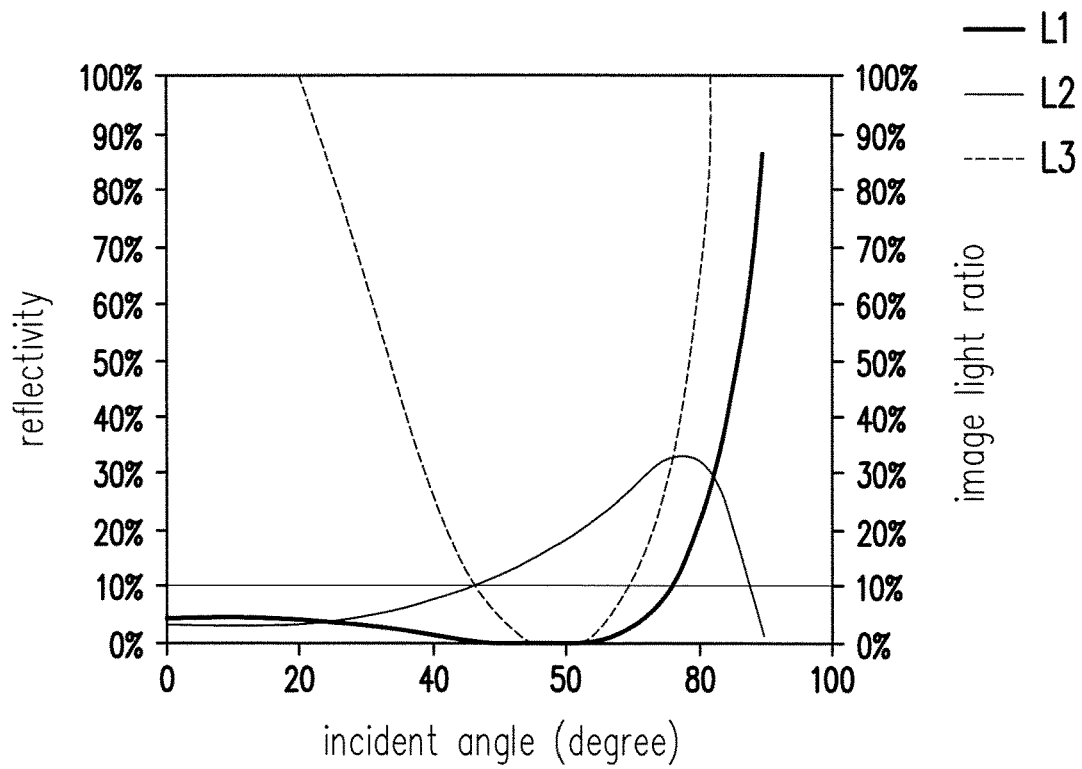
FIG. 4 is a graph showing a relationship between the incident angle and reflectivity/the image light intensity ratio between the outer polarized image light and the inner polarized image light in a case where the display system includes the polarization conversion unit and the polarized image light projected by the image source is a P-polarized light.
Figure 5:
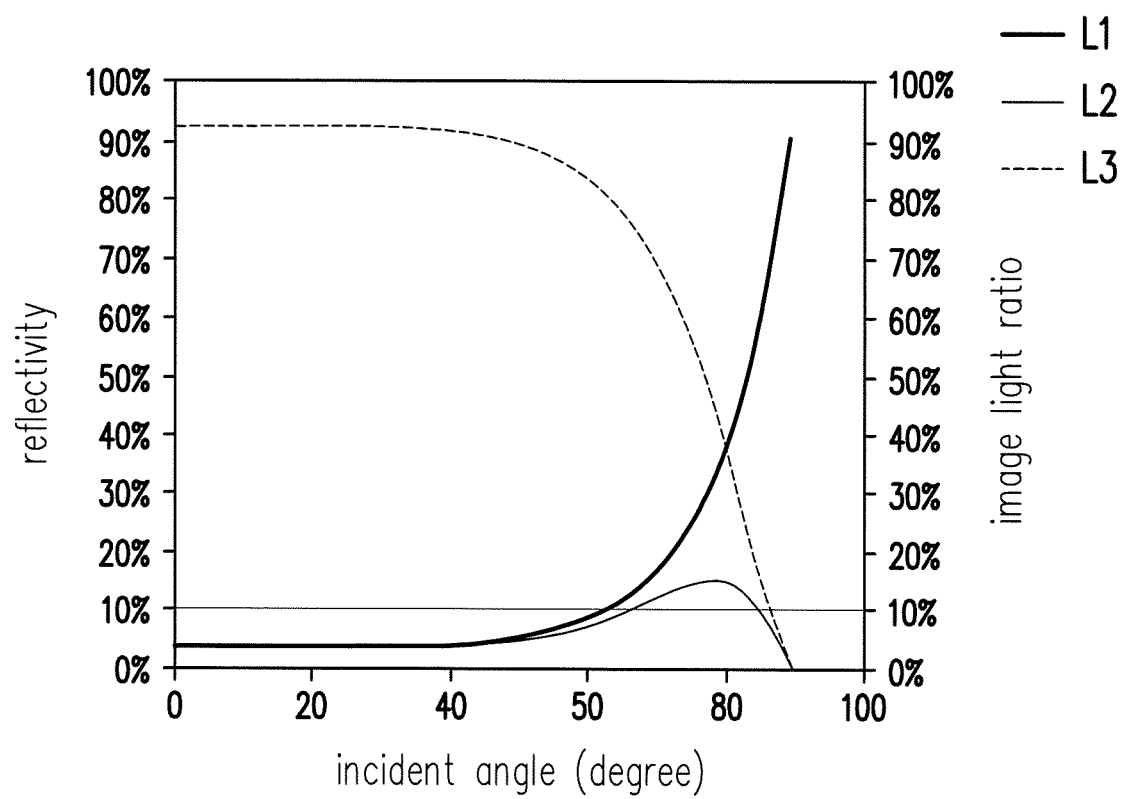
FIG. 5 is a graph showing a relationship between the incident angle and reflectivity/the image light intensity ratio of an unpolarized light between the outer surface and the inner surface in a case where the display system does not include the polarization conversion unit and the image light projected by the image source is an unpolarized light.

How the display system 100 improves ghost images is described below with reference to FIG. 2 to FIG. 5. FIG. 3 is a graph showing a relationship between an incident angle and reflectivity/an image light intensity ratio between the outer polarized image light and the inner polarized image light in a case where the display system includes the polarization conversion unit and the polarized image light projected by the image source is an S-polarized light. FIG. 4 is a graph showing a relationship between the incident angle and reflectivity/the image light intensity ratio between the outer polarized image light and the inner polarized image light in a case where the display system includes the polarization conversion unit and the polarized image light projected by the image source is a P-polarized light. FIG. 5 is a graph showing a relationship between the incident angle and reflectivity/the image light intensity ratio of an unpolarized light between the outer surface and the inner surface in a case where the display system does not include the polarization conversion unit and the image light projected by the image source is an unpolarized light. In FIG. 3 and FIG. 4, a curve L1 indicates a reflectivity of the inner polarized image light, a curve L2 indicates a reflectivity of the outer polarized image light, and a curve L3 indicates the image light intensity ratio between the outer polarized image light and the inner polarized image light. In FIG. 5, the curve L1 indicates a reflectivity of the unpolarized light on the inner surface of the transflective optical plate without the polarization conversion unit, the curve L2 indicates a reflectivity of the unpolarized light on the outer surface of the transflective optical plate without the polarization conversion unit, and the curve L3 indicates the image light intensity ratio of the unpolarized light between the outer surface and the inner surface.

Referring to FIG. 2, after the polarized image light P1 having the polarization state (e.g. P-polarized light or S-polarized light) projected by the image source 110 is transmitted to the inner surface SI (a side surface of the transflective optical plate 120 that faces the driver) of the transflective optical plate 120, a portion of the polarized image light P1 (e.g. a polarized image light P11) is reflected to the driver's eyes by the inner surface SI while another portion of the polarized image light P1 (e.g. a polarized image light P12) passes through the inner surface SI and enters the transflective optical plate 120 to be transmitted toward the outer surface SO. While the polarized image light P12 is transmitted to the outer surface SO, the polarization state of the polarized image light P12 is changed because the polarized image light P12 passes through the half-wave plate 1222. For example, the P-polarized light is changed to the S-polarized light, or the S-polarized light is changed to the P-polarized light. A portion of the polarized image light P12 transmitted to the outer surface SO turns due to interface reflection and is transmitted toward the inner surface SI while another portion of the polarized image light P12 passes through the outer surface SO and exits the transflective optical plate 120. While the polarized image light P12 is transmitted to the inner surface SI, the polarization state of the polarized image light P12 is changed again because the polarized image light P12 passes through the half-wave plate 1222 again. According to the above, the polarization state of the polarized image light P12, which is reflected by the outer surface SO and passes through the inner surface SI to be transmitted to the driver's eyes, (i.e. the outer polarized image light) is the same as the polarization state of the polarized image light P1 projected by the image source 110 and the polarization state of the polarized image light P11 reflected by the inner surface SI (i.e. the inner polarized image light). Moreover, the polarization state of the polarized image light P11 reflected by the inner surface SI (i.e. the inner polarized image light) is different from the polarization state of the polarized image light P12 reflected by the outer surface SO in the transflective optical plate 120.

According to the Fresnel equation, the P-polarized light and the S-polarized light have different reflectivities with respect to the same medium. Take interface reflection of a polarized light in the interface of air and glass for example, when the light enters glass from air, if the incident angle is greater than 20 degrees, the reflectivity of the S-polarized light is greater than the reflectivity of the P-polarized light. In addition, when the light enters air from glass, if the incident angle is greater than 10 degrees and smaller than 40 degrees, the reflectivity of the S-polarized light is also greater than the reflectivity of the P-polarized light.

Since different polarized lights (the P-polarized light and the S-polarized light) have different reflectivities in interface reflection, in this embodiment, the polarization conversion unit 122 is used to change the polarization state of the polarized image light so as to differentiate the polarization state of the polarized image light P11 reflected by the inner surface SI (i.e. the inner polarized image light) from the polarization state of the polarized image light P12 reflected by the outer surface SO and thereby effectively enhance the light intensity difference between the outer polarized image light and the inner polarized image light, such that the transflective optical plate 120 efficiently improves ghost images for the display system 100 to render favorable image quality.

For example, as shown in FIG. 3, if the polarized image light P1 is the S-polarized light, the incident angle θ at which the polarized image light P1 enters the transparent protective layer 126 may be set greater than 40 degrees, such that the image light intensity ratio between the outer polarized image light and the inner polarized image light is less than 10%. On the other hand, as shown in FIG. 4, if the polarized image light P1 is the P-polarized light, the incident angle θ at which the polarized image light P1 enters the transparent protective layer 126 may be set to 47 degrees or more and 68 degrees or less. Accordingly, ghost images are improved efficiently such that the display system 100 renders favorable image quality. In the comparative example of FIG. 5, the image light projected by the image source 110 is an unpolarized light and the transflective optical plate 120 does not include the polarization conversion unit 122. In this configuration, the incident angle of the image light needs to be greater than 87 degrees, so as to reduce the image light intensity ratio of the outer image light and the inner image light to 10% or less. However, such a great incident angle will make it difficult to project the image light to the human eyes, which imposes difficulty in building the system. In comparison with the comparative example, in this embodiment, different polarized image lights that have different reflectivities in interface reflection are used to improve ghost images while the incident angle remains in a range that can be implemented.

In the case where ghost images are improved, if the light intensity of the polarized image light P1 provided by the image source 110 is reduced, the driver is still able to see the image. Therefore, in this embodiment, the light intensity of the polarized image light P1 provided by the image source 110 may be further reduced to reduce the power consumption of the image source 110 and the heat generated by the projection.

Moreover, in this embodiment, the optical film 124 further enhances the light intensity difference between the outer polarized image light and the inner polarized image light or reduces the interference of the ambient light. For example, the optical film 124 may be an infrared light reflective film for reflecting an infrared light in an external light, such as sunlight, so as to prevent the infrared light from entering the vehicle through the transflective optical plate 120, thereby enhancing the heat insulation effect. In this configuration, a reflectivity of the optical film 124 with respect to the infrared light is 70% or more. Alternatively, the optical film 124 may be a visible light micro-reflective film, which has a reflectivity of 50% or less with respect to a visible light. The reflectivity of the visible light micro-reflective film is preferably 15% or more and 20% or less, so as to maintain a desired transmittance (a transmittance greater than 70%). The visible light micro-reflective film reduces the light intensity of the polarized image light P12 that is transmitted to the human eyes through the inner surface SI, so as to further enhance the light intensity difference between the outer image light and the inner image light. In this configuration, a distance D from an upper surface (i.e. the inner surface SI) of the transparent protective layer 126 to an upper surface ST of the optical film 124 may be less than 0.5 mm, so as to prevent the polarized image light P12 reflected by the inner surface SI and the polarized image light (not shown) reflected back to the human eyes by the upper surface ST from causing ghost images.

In the configuration where the optical film 124 is the infrared light reflective film or the visible light micro-reflective film, the optical film 124 may be a thin film formed of a metal, an alloy, or a combination of the foregoing; and a thickness of the optical film 124 is 500 Å or less, and preferably 150 Å or less, so as to maintain the desired transmittance. Alternatively, the optical film 124 may be a thin film formed by mixing a plurality of nano metal particles and a polymer material, and a particle size of each nano metal particle is 150 nm or less, and preferably 100 nm or less. Furthermore, the optical film 124 may be a multi-layer film formed by alternately stacking a plurality of high refractive index dielectric layers and a plurality of low refractive index dielectric layers.

In an embodiment, the optical film 124 may be a visible light micro-absorption film for reducing the light intensity of the polarized image light P12 that is transmitted to the human eyes through the inner surface SI, so as to further enhance the light intensity difference between the outer image light and the inner image light. In this configuration, the optical film 124 may be formed by curing a polymer material added with a dye and attaching the cured material to the half-wave plate 1222. Alternatively, the optical film 124 may be formed by applying a dye onto the half-wave plate 1222 and then curing it.

Figure 7:
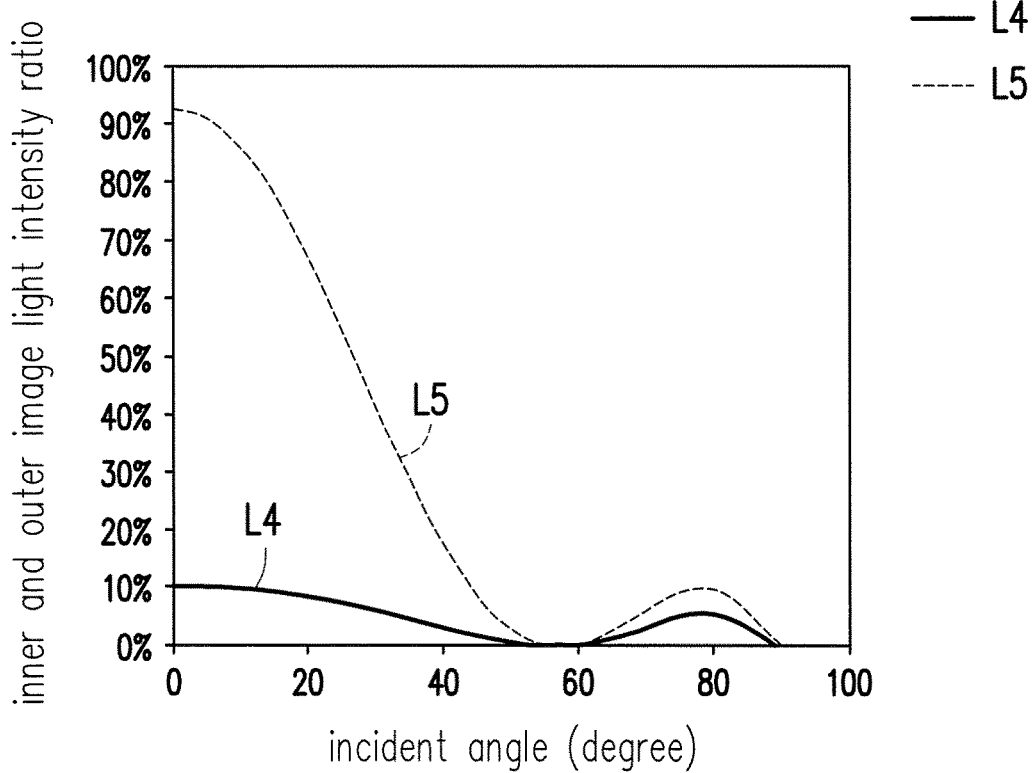
FIG. 7 is a graph showing a relationship between the incident angle and the inner and outer image light intensity ratio in a case where the display system includes/does not include the visible light micro-reflective film.
Figure 9:
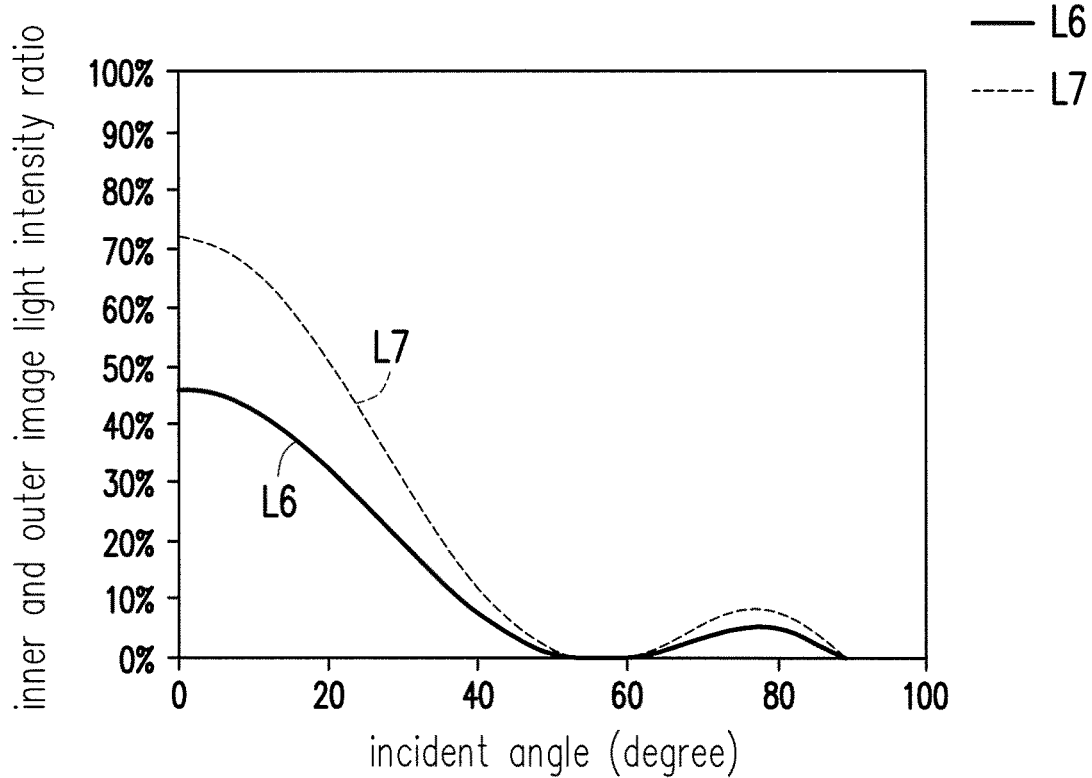
FIG. 9 is a graph showing a relationship between the incident angle and the inner and outer image light intensity ratio in a case where the display system includes/does not include the visible light micro-absorption film.

Hereinafter, the influence that the visible light micro-reflective film and the visible light micro-absorption film have on the inner and outer image light intensity ratio (i.e. the image light intensity ratio between the outer image light and the inner image light) is described with reference to FIG. 6 to FIG. 9. FIG. 6 is a second schematic diagram of the transflective optical plate of FIG. 1, wherein the optical film of the transflective optical plate is the visible light micro-reflective film. FIG. 7 is a graph showing a relationship between the incident angle and the inner and outer image light intensity ratio in a case where the display system includes/does not include the visible light micro-reflective film. FIG. 8 is a second schematic diagram of the transflective optical plate of FIG. 1, wherein the optical film of the transflective optical plate is the visible light micro-absorption film. FIG. 9 is a graph showing a relationship between the incident angle and the inner and outer image light intensity ratio in a case where the display system includes/does not include the visible light micro-absorption film. In FIG. 7, a curve L4 represents the inner and outer image light intensity ratio in a case where the visible light micro-reflective film is disposed while a curve L5 represents the inner and outer image light intensity ratio in a case where the visible light micro-reflective film is absent. In FIG. 9, a curve L6 represents the inner and outer image light intensity ratio in a case where the visible light micro-absorption film is disposed while a curve L7 represents the inner and outer image light intensity ratio in a case where the visible light micro-absorption film is absent. A transflective optical plate 120A of FIG. 6 and FIG. 8 is similar to the transflective optical plate 120 of FIG. 2, and a main difference therebetween lies in the order of stacking the half-wave plate 1222 and the optical film 124.

Referring to FIG. 6, in a configuration where the polarized image light P1 projected by the image source 110 is the S-polarized light, if the incident angle θ is 75 degrees, the light intensity ratio of the polarized image light P11 reflected by the inner surface SI is about 40% and the light intensity ratio of the polarized image light P12 refracted into the transflective optical plate 120 through the inner surface SI is about 60%, wherein a refraction angle is 37.7 degrees. When the polarized image light P12 that enters the transflective optical plate 120 passes through the half-wave plate 1222 for the first time, the S-polarized light is converted to the P-polarized light, and then a portion of the polarized image light P12 that continues to be transmitted to the visible light micro-reflective film (the optical film 124) is reflected while another portion passes through. Take the visible light micro-reflective film having a reflectivity of 20% as an example, about 12% of the polarized image light P12 is reflected and about 48% of the polarized image light P12 passes through the visible light micro-reflective film. The light intensity ratio of the polarized image light P13 that is reflected by the visible light micro-reflective film and sequentially passes through the half-wave plate 1222 and the inner surface SI to the human eyes is about 7.2%, and the light intensity ratio of the polarized image light P12 that is converted to the P-polarized light and passes through the visible light micro-reflective film to be reflected by the outer surface SO is about 5.1%. The polarized image light P12 reflected by the outer surface SO is reflected again by the visible light micro-reflective film, so as to further reduce the light intensity ratio of the polarized image light P12 that is reflected by the outer surface SO and passes through the visible light micro-reflective film to 4.1%. Then, when the polarized image light P12 passes through the half-wave plate 1222 for the second time, the P-polarized light is converted back to the S-polarized light and the light intensity of the polarized image light P12 that continues to be transmitted and passes through the inner surface SI is further reduced to 2.5%. In this configuration, the distance D from the upper surface (i.e. the inner surface SI) of the transparent protective layer 126 to the upper surface ST of the optical film 124 may be less than 0.5 mm, so as to prevent the polarized image light P12 reflected by the inner surface SI and the polarized image light P13 reflected back to the human eyes by the upper surface ST from causing ghost images, and the light intensity of the polarized image light P12 reflected by the inner surface SI and the light intensity of the polarized image light P13 reflected back to the human eyes by the upper surface ST may be accumulated. It may be deemed that the light intensity of the polarized image light P12 reflected by the inner surface SI is 47.2%, and in comparison with the light intensity, i.e. 2.5%, reflected to the human eyes by the outer surface SO, the light intensity of the inner image light (i.e. the polarized image light P11) is much higher than the light intensity of the outer image light (i.e. the polarized image light P12). As shown in FIG. 7, as compared with a case where the visible light micro-reflective film is absent, disposing the visible light micro-reflective film indeed suppresses ghost images.

Referring to FIG. 8, in a configuration where the polarized image light P1 projected by the image source 110 is the S-polarized light, if the incident angle θ is 75 degrees, the light intensity ratio of the polarized image light P11 reflected by the inner surface SI is about 40% and the light intensity ratio of the polarized image light P12 that enters the transflective optical plate 120 through the inner surface SI is about 60%. When the polarized image light P12 that enters the transflective optical plate 120 passes through the half-wave plate 1222 for the first time, the S-polarized light is converted to the P-polarized light, and then a portion of the polarized image light P12 that continues to be transmitted to the visible light micro-absorption film (the optical film 124) is absorbed while another portion passes through. Take the visible light micro-absorption film having an absorption rate of 20% as an example, only about 45% of the polarized image light P12 passes through the visible light micro-absorption film. The light intensity of the polarized image light P12 converted to the P-polarized light, which passes through the visible light micro-absorption film and is reflected by the outer surface SO, is about 5%. The polarized image light P12 reflected by the outer surface SO is absorbed again by the visible light micro-absorption film, so as to further reduce the polarized image light P12 that is reflected by the outer surface SO and passes through the visible light micro-absorption film to 4% or less, and the light intensity of the polarized image light P12 that is reflected by the outer surface SO and passes through the inner surface SI is further reduced to about 2%. The light intensity of the polarized image light P12 reflected by the inner surface SI is 40%. As compared with the light intensity, i.e. 2%, reflected to the human eyes by the outer surface SO, the light intensity of the inner image light (i.e. the polarized image light P11) is much higher than the light intensity of the outer image light (i.e. the polarized image light P12). As shown in FIG. 9, as compared with a case where the visible light micro-absorption film is absent, disposing the visible light micro-absorption film indeed suppresses ghost images.

Referring to FIG. 2 again, the transparent protective layer 126 completely covers the layer below, so as to protect the layer from damage (scratch or oxidation, for example). In this embodiment, the transparent protective layer 126 completely covers the optical film 124, but the invention is not limited thereto. In another embodiment, the positions of the half-wave plate 1222 and the optical film 124 may be switched, and the transparent protective layer 126 may completely cover the half-wave plate 1222 (as shown in FIG. 6 and FIG. 8). The transparent protective layer 126 is formed of an isotropic material or a low complex refractive index material. For example, a material of the transparent protective layer 126 may include glass, propylene carbonate (PC), cyclic olefin copolymer (COC), cyclo-olefin polymer (COP), polymethylmethacrylate (PMMA), tri-acetyl-cellulose (TAC), silicon oxide, or titanium oxide, but not limited thereto.

In a configuration where the polarized image light P1 projected by the image source 110 is the S-polarized light, the light intensity of the inner image light (i.e. the polarized image light P11) is higher than the light intensity of the outer image light (e.g. the polarized image light P12 transmitted to the human eyes through the inner surface SI). By making a refractive index of the transparent protective layer 126 higher than a refractive index of the layer below (e.g. the optical film 124 or the half-wave plate 1222), the light intensity ratio of the polarized image light P12 transmitted to the human eyes through the inner surface SI is further reduced, so as to further enhance the light intensity difference between the outer image light and the inner image light. On the other hand, in a configuration where the polarized image light P1 projected by the image source 110 is the P-polarized light, the light intensity of the inner image light (i.e. the polarized image light P11) is lower than the light intensity of the outer image light (i.e. the polarized image light P12). Therefore, by making the refractive index of the transparent protective layer 126 lower than the refractive index of the layer below (e.g. the optical film 124 or the half-wave plate 1222), the light intensity ratio of the polarized image light P12 transmitted to the human eyes through the inner surface SI is increased, so as to further enhance the light intensity difference between the outer image light and the inner image light.

Figure 10:
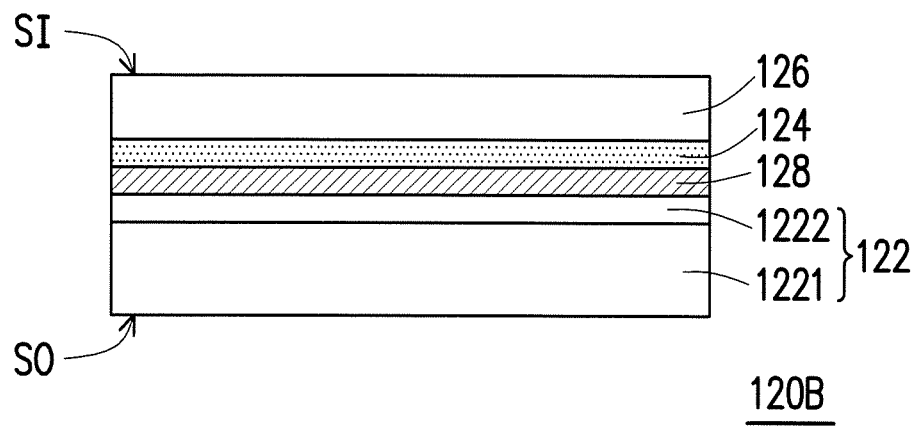
FIG. 10 and FIG. 11 are the third and the fourth schematic diagrams of the transflective optical plate of FIG. 1 respectively.
Figure 11:
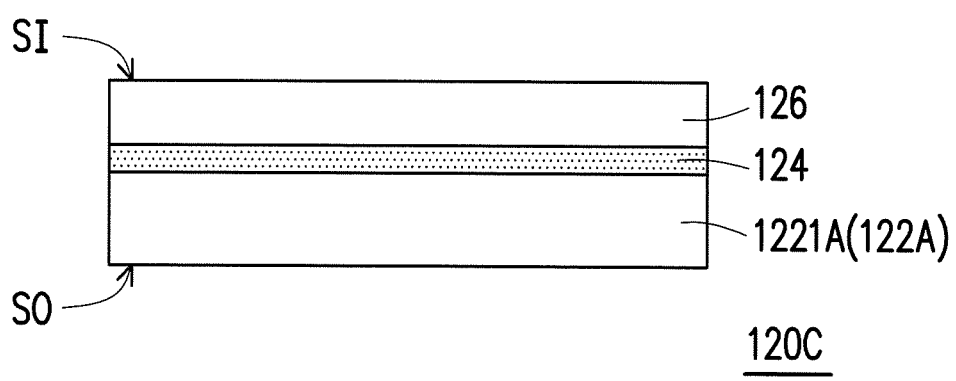

Hereinafter, other embodiments of the transflective optical plate of FIG. 1 are described with reference to FIG. 10 and FIG. 11, wherein the same components are assigned with the same reference numerals. Thus, description of the materials, relative configuration, and effects thereof are not repeated hereinafter. FIG. 10 and FIG. 11 respectively illustrate the third and the fourth schematic diagrams of the transflective optical plate of FIG. 1. Referring to FIG. 10, a transflective optical plate 120B is similar to the transflective optical plate 120 of FIG. 2, and a main difference therebetween is that the transflective optical plate 120B further includes a phase compensation film 128. The phase compensation film 128 is disposed on the combiner 1221 and located between the combiner 1221 and the transparent protective layer 126. In this embodiment, the half-wave plate 1222 is located between the combiner 1221 and the phase compensation film 128, and the optical film 124 is located between the phase compensation film 128 and the transparent protective layer 126. However, the arrangement of the half-wave plate 1222, the optical film 124, and the phase compensation film 128 may be changed as required.

A phase delay amount of the polarized image light P12 obliquely incident to the polarization conversion unit 122 is compensated by the phase compensation film 128, such that the phase delay amount of the polarized image light P12 obliquely incident to the polarization conversion unit 122 is ½ wavelength, so as to reduce the influence of oblique incidence on the polarization state conversion. For example, if the polarized image light P12 has an additional phase delay amount of ⅑ wavelength due to the oblique incidence, the phase compensation film 128 may be used to provide a phase delay amount of −⅑ wavelength, such that the phase delay amount of the polarized image light P12 incident to the outer surface SO is ½ wavelength. However, the method of compensating for the phase delay amount is not limited to the above.

The phase compensation film 128 may be formed by photo-aligning an anisotropic material (such as a liquid crystal polymer). Alternatively, the phase compensation film 128 may be formed by mixing an isotropic material with an anisotropic material. Furthermore, the phase compensation film 128 may also be formed by extending an isotropic material. The isotropic material may include propylene carbonate (PC), cyclo-olefin polymer (COP), or polyimide (PI), but not limited thereto.

Referring to FIG. 11, a transflective optical plate 120C is similar to the transflective optical plate 120 of FIG. 2, and a main difference therebetween lies in that a combiner 1221A of a polarization conversion unit 122A of the transflective optical plate 120C may change the polarization state of the polarized image light. Thus, the half-wave plate 1222 of FIG. 2 is omitted from the polarization conversion unit 122A. Specifically, the combiner 1221A may be formed by curing an anisotropic material to be suitable for changing the polarization state of the polarized image light. The anisotropic material is a liquid crystal polymer, for example, but not limited thereto. Alternatively, the combiner 1221A may be formed by mixing an isotropic material with an anisotropic material to be suitable for changing the polarization state of the polarized image light. For example, the combiner 1221A may be formed by mixing propylene carbonate (PC) and a liquid crystal polymer, but not limited thereto. Furthermore, the combiner 1221A may be formed by extending an isotropic material to be suitable for changing the polarization state of the polarized image light. The isotropic material may include propylene carbonate (PC), cyclo-olefin polymer (COP), or polyimide (PI), but not limited thereto.

FIG. 10 and FIG. 11 illustrate cases where the phase delay amount of the polarized image light P12 obliquely incident to the polarization conversion unit 122 is compensated by the phase compensation film 128 and the half-wave plate 1222, so as to reduce the influence of oblique incidence on the polarization state conversion, but the invention is not limited thereto. Take the structure of the transflective optical plate 120 of FIG. 2 as an example, the polarization conversion unit 122 that has a phase delay amount of ½λ-¼λ may be selected, such that it is not required to additionally dispose the phase compensation film to compensate for the phase delay amount of the polarized image light P12 obliquely incident to the polarization conversion unit 122 to reduce the influence of oblique incidence on the polarization state conversion.

In conclusion of the above, the embodiments of the invention achieve at least one of the following advantages or effects. According to the embodiments of the invention, the polarization conversion unit changes the polarization state of the polarized image light, so as to use the difference between the reflectivities of different polarized lights with respect to interface reflection to enhance the light intensity difference between the polarized image light reflected by the inner surface of the transflective optical plate (referred to as "inner polarized image light" hereinafter) and the polarized image light reflected by the outer surface of the transflective optical plate (referred to as "outer polarized image light" hereinafter). Moreover, in the embodiments of the invention, the optical film further enhances the light intensity difference between the inner polarized image light and the outer polarized image light or reduces interference of the ambient light. Accordingly, the transflective optical plate of the invention improves the problem of ghost images and the display system of the invention renders favorable image quality. In the case where ghost images are improved, in the embodiments of the invention, the light intensity of the polarized image light provided by the image source may also be lowered to reduce the power consumption of the image source and the heat generated by the projection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display system, comprising:
   an image source providing a polarized image light; and
   a transflective optical plate disposed on a transmission path of the polarized image light and comprising:
   a polarization conversion unit adapted to change a polarization state of the polarized image light and comprising a combiner, wherein the combiner is adapted to change the polarization state of the polarized image light;
   an optical film disposed on the combiner; and
   a transparent protective layer disposed on the optical film, wherein the optical film is located between the combiner and the transparent protective layer, and the combiner is formed by curing an anisotropic material.

2. The display system according to claim 1, wherein the optical film is a thin film formed of a metal, an alloy, or a combination of the metal and the alloy, and the optical film has a thickness of 500 Å or less.

3. The display system according to claim 1, wherein a material of the transparent protective layer comprises glass, propylene carbonate (PC), cyclic olefin copolymer (COC), cyclo-olefin polymer (COP), polymethylmethacrylate (PMMA), tri-acetyl-cellulose (TAC), silicon oxide, or titanium oxide.

4. The display system according to claim 1, wherein the polarized image light is an S-polarized light, and an incident angle of the polarized image light to the transparent protective layer is greater than 40 degrees.

5. The display system according to claim 1, wherein the polarized image light is a P-polarized light, and an incident angle of the polarized image light to the transparent protective layer is 47 degrees or more and 68 degrees or less.

6. The display system according to claim 1, wherein a phase delay amount of the polarization conversion unit is in a range of $\frac{1}{2}\lambda$-$\frac{1}{4}\lambda$.

7. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, and the combiner is formed by mixing an isotropic material and an anisotropic material.

8. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, the optical film is a thin film formed by mixing a plurality of nano metal particles and a polymer material, and a particle size of each of the nano metal particles is 150 nm or less.

9. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, and the optical film is a multi-layer film formed by alternately stacking a plurality of high refractive index dielectric layers and a plurality of low refractive index dielectric layers.

10. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, and the optical film has a reflectivity of 70% or more with respect to an infrared light.

11. The display system according to claim 10, wherein a distance between an upper surface of the transparent protective layer and an upper surface of the optical film is less than 0.5 mm.

12. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, and the optical film has a reflectivity of 50% or less with respect to a visible light.

13. A display system, comprising:
an image source providing a polarized image light; and
a transflective optical plate disposed on a transmission path of the polarized image light and comprising:
  a polarization conversion unit adapted to change a polarization state of the polarized image light and comprising a combiner, wherein the combiner is adapted to change the polarization state of the polarized image light;
  an optical film disposed on the combiner; and
  a transparent protective layer disposed on the optical film, wherein the optical film is located between the combiner and the transparent protective layer, and the optical film has an absorption rate of 50% or less with respect to a visible light.

* * * * *